US012610388B2

(12) United States Patent (10) Patent No.: US 12,610,388 B2
Burkhardt et al. (45) Date of Patent: Apr. 21, 2026

(54) COMMUNICATION SYSTEM

(71) Applicant: Fraunhofer-Gesellschaft zur Förderung der angewandten Forschung e.V., Munich (DE)

(72) Inventors: Frank Burkhardt, Erlangen (DE); Friedemann Laue, Erlangen (DE); Stefan Köhler, Erlangen (DE); Anna Neupert, Erlangen (DE); Hannes Ellinger, Erlangen (DE); Priyanka Neuhaus, Erlangen (DE); Jürgen Hupp, Erlangen (DE); Thomas Windisch, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 319 days.

(21) Appl. No.: 18/183,451

(22) Filed: Mar. 14, 2023

(65) Prior Publication Data

US 2023/0217479 A1     Jul. 6, 2023

Related U.S. Application Data

(63) Continuation of application No. PCT/EP2020/076182, filed on Sep. 18, 2020.

(51) Int. Cl.
*H04W 72/541* (2023.01)
*H04W 52/24* (2009.01)
(Continued)

(52) U.S. Cl.
CPC ....... *H04W 72/541* (2023.01); *H04W 52/243* (2013.01); *H04W 72/04* (2013.01); *H04W 74/0808* (2013.01)

(58) Field of Classification Search
CPC . H04W 72/541; H04W 52/243; H04W 72/04; H04W 74/0808; H04W 72/23;
(Continued)

(56) References Cited

U.S. PATENT DOCUMENTS

| | | | |
|---|---|---|---|
| 5,412,659 | A | 5/1995 | Fujita et al. |
| 2002/0119782 | A1 | 8/2002 | Voyer |

(Continued)

FOREIGN PATENT DOCUMENTS

| | | |
|---|---|---|
| CN | 101005299 A | 7/2007 |
| CN | 101466149 A | 6/2009 |

(Continued)

OTHER PUBLICATIONS

International Search Report and Written Opinion issued in application No. PCT/EP2020/076182.
(Continued)

*Primary Examiner* — Dady Chery
(74) *Attorney, Agent, or Firm* — McClure, Qualey & Rodack, LLP

(57) ABSTRACT

A communication system, including: a plurality of communication devices communicating with each other by use of RF resources; a resource controller configured to control the RF resources; and an interference detector configured to detect an interferer and to provide information describing the interferer to the resource controller, wherein the resource controller controls the RF resources of the plurality of communication devices taking into account the information describing the interferer.

32 Claims, 6 Drawing Sheets

(51) Int. Cl.
*H04W 72/04* (2023.01)
*H04W 74/0808* (2024.01)
(58) Field of Classification Search
CPC .............. H04W 16/14; H04W 74/006; H04W 74/0816; H04L 5/006; H04L 5/0037; H04L 5/0091
See application file for complete search history.

(56) References Cited

U.S. PATENT DOCUMENTS

| | | | |
|---|---|---|---|
| 2005/0130592 A1 | 6/2005 | Dowling | |
| 2007/0153717 A1* | 7/2007 | Tervonen | H04W 72/20 370/320 |
| 2007/0165757 A1 | 7/2007 | Heiman et al. | |
| 2008/0292032 A1 | 11/2008 | Belogolovy et al. | |
| 2009/0161619 A1 | 6/2009 | Noma | |
| 2009/0247166 A1* | 10/2009 | Luo | H04W 72/02 455/436 |
| 2010/0067445 A1* | 3/2010 | Rinne | H04L 5/0053 370/329 |
| 2010/0075704 A1* | 3/2010 | McHenry | H04W 16/14 455/67.11 |
| 2010/0080323 A1 | 4/2010 | Mueck et al. | |
| 2013/0242927 A1* | 9/2013 | Luo | H04W 72/541 370/329 |
| 2014/0126404 A1 | 5/2014 | Kim | |
| 2015/0382365 A1 | 12/2015 | Li et al. | |
| 2018/0070362 A1 | 3/2018 | Ryan et al. | |
| 2019/0037418 A1 | 1/2019 | Gunasekara | |
| 2020/0028745 A1* | 1/2020 | Parkvall | H04W 52/028 |
| 2020/0059962 A1* | 2/2020 | Tejedor | H04W 76/14 |
| 2020/0120482 A1 | 4/2020 | Parkvall et al. | |

FOREIGN PATENT DOCUMENTS

| | | |
|---|---|---|
| CN | 104349437 A | 2/2015 |
| CN | 104782066 A | 7/2015 |
| CN | 105027655 A | 11/2015 |
| CN | 106488565 A | 3/2017 |
| CN | 110736957 A | 1/2020 |
| EP | 1 233 642 A1 | 8/2002 |
| EP | 2 071 886 A1 | 6/2009 |
| EP | 2 151 063 B1 | 12/2016 |
| EP | 2 071 886 B1 | 1/2019 |
| RU | 2519041 C2 | 6/2014 |
| WO | 2013/168361 A1 | 11/2013 |
| WO | 2014/158258 A1 | 10/2014 |
| WO | 2015/019179 A1 | 2/2015 |
| WO | 2015/019179 A2 | 2/2015 |

OTHER PUBLICATIONS

Ericsson; "On NR operations in 52.6 to 71 GHz;" 3GPP Draft; R1-2005920, Aug. 8, 2020, 3rd Generation Partnership Project (3GPP), Mobile Competence Centre; Aug. 2020; pp. 1-37.

Aktas, I., et al.; "Funktechnologien fur Industrie 4.0;" VDE ITG, Frankfurt am Main, 2017; pp. 1-56.

Frotzscher, A., et al.; "Requirements and current solutions of wireless communication in industrial automation;" IEEE International Conference on Communications Workshops (ICC), Sydney; 2014; pp. 67-72.

Schulze, D., et al.; "Anforderungsprofile im ZDKI;" 2020; pp. 1-48.

Frotzscher, A., et al.; "fast automation" [Online]: https://de.fast-zwanzig20.de/industrie/fast-automation/; pp. 1-3.

Ellinger, F., et al.; I "fast realtime," [Online]: https://de.fast-zwanzig20.de/basisvorhaben/fast-realtime/; ps. 1-6.

The Institute of Electrical and Electronics Engineers (HRSG.); "IEEE Standard for a Precision Clock Synchronization Protocol for Networked Measurement and Control Systems;" IEEE Std. 1588-2002; pp. 1-289.

Chinese language office action dated Jul. 30, 2024, issued in application No. CN 202080107262.1.

English language translation of office action dated Jul. 30, 2024 (pp. 1-9 of attachment).

Chinese Notice of Allowance dated May 29, 2025 issued in CN application No. 202080107262.1.

* cited by examiner received power of
interference source (IS)

attenuation of path basestation (BS)
=> device 3 (D3) due to blockage time2: BS and other devices
transmit synchronously to D3 time1: BS trandsmitts to all devices

COMMUNICATION SYSTEM

CROSS-REFERENCE TO RELATED APPLICATION

This application is a continuation of copending International Application No. PCT/EP2020/076182, filed Sep. 18, 2020, which is incorporated herein by reference in its entirety.

Embodiments of the present invention refer to a communication system, especially to a communication system comprising an interference detector and/or to a communication system comprising a resource controller. Further embodiments refer to the corresponding methods for resource controlling into the respective resource controller for the communication system. According to further embodiments, a user equipment or base station is part of the controller or comprises the controller. Some embodiments use so-called ISM bands.

BACKGROUND OF THE INVENTION

Communication in ISM bands (e.g. IEEE 802.11; IEEE 802.14, IEEE 802.15) address and avoid the problem of erroneous packet reception due to interference by repetition of data-packets, blacklisting of channels with high interference, frequency hopping, listen-before talk and relying on higher level protocols (TCP) to ensure data consistency.

Communication Systems in Licensed bands (e.g. 3GPP LTE, 5G) are typically centrally coordinated and assume a clean band without interference sources, concentrate on optimizing the coordinated resources, and trie to apply the minimum transmission power for an error free communication to limit spillover and the wasting of transmission power. To that purpose, strong and long FEC codes (e.g. LDPC, Turbo) are applied, accompanied by retransmission schemes such as hybrid ARQ. On top of this, the systems are multi-base-station systems that coordinate the connection between User Equipment (UE) and base station (BS) in a way that the best match of UE and BS is achieved.

The listen before talk algorithms has the purpose to avoid collision of transmitted packets within the used RF resources. The problem to be solved by embodiments/aspects of this invention is the degradation of a wireless communication system due to the presence of high interference power or the restriction of transmission power due to regulations.

SUMMARY

An embodiment may have a communication system, comprising: a plurality of communication devices communicating with each other by use of RF resources; a resource controller configured to control the RF resources; and an interference detector configured to detect an interferer and to provide information describing the interferer to the resource controller, wherein the resource controller controls the RF resources of the plurality of communication devices taking into account the information describing the interferer; wherein the interference detector is configured to discern between an interferer superimposing RF power for all devices and a blockage event affecting at least one of the plurality of communication devices and/or wherein the interference detector is configured to determine a trajectory and/or a movement of the interferer based on the determination over a frame or a plurality of frames.

Another embodiment may have a communication system, comprising: a plurality of communication devices communicating with each other by use of an RF resource; a resource controller configured to control the RF resources, wherein the resource controller is configured to synchronize at least two of a plurality of communication devices with regard to its transmit signals, so that said transmit signals are superimposing to each other and are forming one superimposed transmit signal.

Another embodiment may have a method for resource controlling within a communication system comprising a plurality of communication devices communicating with each other by use of RF resources, comprising: detecting an interferer and providing information describing the interferer; and controlling the RF resources of the plurality of communication devices taking into account information describing the interferer; discerning between an interferer superimposing RF power for all devices and a blockage event affecting at least one of the plurality of communication devices and/or determining a trajectory and/or a movement of the interferer based on the determination over a frame or a plurality of frames.

Another embodiment may have a method for resource controlling within a communication system comprising a plurality of communication devices communicating with each other by use of RF resources, the method comprises: synchronizing at least two of the plurality of communication devices with regard to its transmit signals so that said transmit signals superimposing to each other and forming one superimposed transmit signal.

Another embodiment may have a resource controller for a communication system comprising a plurality of communication devices communicating with each other by use of RF resources, the controller comprising: a resource controller configured to control the RF resources and an interference detector configured to detect an interferer and to provide information describing an interferer to the resource controller, wherein the resource controller controls the resources of the plurality of devices taking into account the information describing an interferer.

Another embodiment may have a resource controller for a communication network comprising a plurality of communication devices communicating with each other by use of RF signals, the controller comprising: a resource controller configured to control the RF resources, wherein the resource controller is configured to synchronize at least two of a plurality of communication devices with regard to its transmit signals, so that said transmit signals superimposing to each other and/or forming one superimposed transmit signal.

Another embodiment may have a user equipment being part of the controller or comprising the inventive controller.

Another embodiment may have a base station being part of the controller or comprising the inventive controller.

Another embodiment may have a communication device, which is configured transmit a transmit signal without listen-before-talk procedure by use of a reduced transmit power level below a listen-before-talk threshold power level and to perform listen-before-talk procedure, while transmitting, and to increase the reduced transmit power level, when successfully finished the listen-before-talk procedure.

Another embodiment may have a method for communicating, comprising: transmitting the transmit signal without listen-before-talk procedure by use of a reduced transmit power level below a listen-before-talk threshold power level; performing listen-before-talk procedure while transmitting; and increasing the reduced transmit power level, when successfully completing the listen-before-talk procedure.

Another embodiment may have a non-transitory digital storage medium having a computer program stored thereon to perform the method for resource controlling within a communication system comprising a plurality of communication devices communicating with each other by use of RF resources, comprising: detecting an interferer and providing information describing the interferer; and controlling the RF resources of the plurality of communication devices taking into account information describing the interferer; discerning between an interferer superimposing RF power for all devices and a blockage event affecting at least one of the plurality of communication devices and/or determining a trajectory and/or a movement of the interferer based on the determination over a frame or a plurality of frames, when said computer program is run by a computer.

Another embodiment may have a non-transitory digital storage medium having a computer program stored thereon to perform the method for resource controlling within a communication system comprising a plurality of communication devices communicating with each other by use of RF resources, the method comprises: synchronizing at least two of the plurality of communication devices with regard to its transmit signals so that said transmit signals superimposing to each other and forming one superimposed transmit signal, when said computer program is run by a computer.

Another embodiment may have a non-transitory digital storage medium having a computer program stored thereon to perform the method for communicating, comprising: transmitting the transmit signal without listen-before-talk procedure by use of a reduced transmit power level below a listen-before-talk threshold power level; performing listen-before-talk procedure while transmitting; and increasing the reduced transmit power level, when successfully completing the listen-before-talk procedure, when said computer program is run by a computer.

Embodiments of the present invention provide a communication system comprising a plurality of communication devices communicating with each other by use of RF resources. According to an aspect 1 the communication system comprises a resource controller and an interference detector. The resource controller is configured to control the RF resources. The interference detector is configured to detect an interferer, like a high interference power or a restricted transmission power and to provide information describing the interferer to the resource controller. The resource controller controls the RF resources of the plurality of communication devices taking into account the information describing the interference.

According to embodiments, the controlling of the RF resources perform such that no collision between the RF resources used by the interferer and the RF resources controlled by the resource controller (used by the communication devices of the communication system) is caused; alternatively or additionally, this can have the aim to minimize the impact of the interferer on the communication between the plurality of communication devices.

According to embodiments, the interference detector is realized as a shared interference detector, i.e., using at least two transceivers of the plurality of communication devices for measurements. Additionally or alternatively an interference detector realized as a shared interference detector uses at least two transceivers of the plurality of communication devices for measurements, wherein said information is shared between the plurality of communication devices so as to implement the shared interference detector. Additionally and alternatively, the control information for controlling the measurements performed by the transceivers for detecting the interferer is exchanged. For example, the control information is used to coordinate scans performed by the transceivers with regard to the scanned resources (e.g., a frequency band, time slot, etc.).

According to embodiments the resource controller is implemented as a shared controller.

Embodiments of this aspect of the invention enables to detect and locate interference power sources regarding position and/or communication resources (time, frequency, space). It is assumed that the system consists of one or multiple base stations and multiple devices. The base station(s) and the devices have a means for detecting RF power. This detection is then used for controlling the resources, e.g., the time slots and/or frequency bands to be used. This enables beneficially the prediction of impairment events in a wireless communication system that allows to react in a timely manner. This highly enhances the performance of real time communication systems as chances for a successful transmission are highly improved. Further, the detection/localization and characterization of an interference source is very helpful for every wireless communication system. This may act as a basis for a general coexistence management function or as the basis for an interference detection device, i.e., a mobile device of the system which guides a user to the source of the interference.

According to embodiments the interference detector is configured to discern between an interferer superimposing RF power to all devices and a blockage event where the interferer is affecting at least one of the plurality of communication devices. For example, the interferer superimposing RF power is determined when a plurality of all communication devices receive the interferer (simultaneously) within the used band or another band; or wherein a blockage event is determined when at least one device receives an RF signal reduced in strength and/or quality when compared to the RF signal received by the other communication devices.

According to embodiments, the interference detector is configured to detect and/or locate the interferer. For example, the information comprises information regarding position and/or a communication resource, a time resource, a frequency resource, a space resource, a duty cycle and/or a transmit power of the interferer. According to embodiments, the interference detector is configured to determine a trajectory and/or movement of the interferer based on the determination of a plurality of frames.

According to embodiments, the communication system comprises a self-organizing network, e.g., a sensor network. Here, all communication devices may be user equipment or, alternatively, at least one communication device is formed by a base station. Note the devices may know their position, e.g. based on a pre-configuration or determine/calculate their position.

Another embodiment according to a second aspect (aspect 2) provides a communication system comprising a plurality of communication devices and a resource controller. The resource controller is configured to control the RF resources and to synchronize and adapt at least two of the plurality of communication devices with regard to its transmit signals so that said transmit signals are superimposing to each other and/or forming one superimposed transmit signal. According to embodiments, the transmit signals output by at least two communication devices are superimposed so as to increase the total transmit power and/or the total signal to noise ratio of the superimposed transmit signal.

Embodiments of this aspect of the invention enable that a high transmit power is generated for transmitting one signal, e.g., a data packet, wherein the transmit power of each transmitter can be low, e.g., below a threshold defined by revelations. Expressed in other words, this means that this enables to combine the power of multiple devices allowing to increase the receive power in a power limited system, without breaking the legal rules. For example, the legal rules define the usage of LBT (listen before talk) procedures.

According to embodiments, at least two communication devices transmit the transmit signal without listen before talk and use a reduced transmit power level below a listen before talk threshold power level. Here, the communication devices communicate within a frequency band defined for a listen before talk procedure. According to embodiments, at least one of the plurality of communication devices is configured to perform listen before talk, e.g., while transmitting with the reduced transmit power (below listen before talk threshold power level). This communication device can then increase a transmit power when successfully completing the listen before talk procedure. Applying listen before talk procedures in a real time system allows to enhance the transmission power for at least a short time, improving the overall system performance. Here, for example, the modulation encoding schemes could be changed according to further embodiments. According to embodiments the entire communication system or a part of same may use this procedure. This means that, for example, one device performs LbT and informs after successfully finishing LbT (no further transmitter found) the devices in the surrounding (predetermined radius) so that the device in the surrounding (part of the communication system) can increase their transmit power. Expressed in other words this means that LbT is performed by one entity for a plurality of entities, so that at least one of the plurality of communication devices performs the listen-before-talk procedure and informs another one of the plurality of communication devices (in the near radius) to increase a transmit power of the another one, when successfully finished the listen-before-talk procedure.

It should be noted that, according to embodiments, the at least two communication devices may be formed by, for example, one communication device which want to transmit a transmit signal and another communication device or by at least to another communication device. Thus, according to an embodiment one of the communication devices transmits a signal to at least one other of the communication devices, said signal is to be transmitted synchronously by the at least two of the communication devices. For Example, the LbT algorithm may be used by a device which currently just listens in the LbT band.

According to embodiments, the resource controller may be configured to force a channel acquisition in order to the pulse interference, e.g. by potentially ignoring the LBT timeout rules, e.g. in case of LBT operation.

According to embodiments, the communication system comprises an interference detector configured to detect an interference and to provide information describing an interferer to the resource controller. The resource controller control the RF resources taking this information into account.

Both aspects result in improved SNR degraded due to limitations in the systems transmission power, especially for communication systems with real-time requirements. Furthermore, with a mobile device having detection and localization capabilities, such interference sources may be found, analyzed, and removed.

Examples for the problem are

A person is carrying an RF-device that is not coordinated with the local system through a factory hall. When that person is passing by a device or base station the SNR of the communication system degrades, which can lead to a loss in communication in the system.

A device that is operating in a frequency band that enforces listen-before-talk (LBT) schemes operates only at a low transmission power to be able avoid LBT regulations. This leads to a low power margin to compensate shadowing or blockage events (like a person standing in between the base station and device), which may lead to erroneous data transmission.

A communication system is disturbed on purpose by transmitting malicious interference (jamming) from a source nearby. Such attacks may result in strong degradation of SNR at the receivers and a loss of the communication system.

Another embodiment provides a method for a resource controller according to aspect 1 within a communication system as described. The method comprises the following steps:

detecting an interferer and providing information describing the interferer; and controlling the RF resources of the plurality of communication devices taking into account information describing the interferer.

Another embodiment provides another method for resource controlling according to aspect 1 within a communication system as described above. This method comprises syncing at least two of the plurality of communication devices with regard to its transmit signals so that said transmit signals superimposing to each other and/or forming one superimposed transmit signal.

According to embodiments, the method may be computer implemented.

Another embodiment provides a resource controller for aspect 1. Another embodiment provides a resource controller for aspect 2. Implementations of these resource controllers have been discussed in context of the communication system.

According to embodiments, the controller can be part of a user equipment or can be shared by a plurality of user equipment. This means, that an embodiment provides a user equipment being part of the controller or comprising the controller according to aspect 1 or aspect 2. According to another embodiment, a base station can be part of (shared controller) or comprising the controller according to aspect 1 or aspect 2.

Another embodiment provides a communication device that is configured to transmit the transmit signal without listen before talk by use of a reduced transmit power level (below a listen before talk threshold level) and to perform listen before talk while transmitting and to increase the reduced transmit power level, when successfully completed the listen before talk procedure. According to another embodiment, a method for communication is provided. The method comprises:

transmitting the transmit signal without listen-before-talk procedure by use of a reduced transmit power level below a listen-before-talk threshold power level;

performing listen-before-talk procedure while transmitting; and increasing the reduce transmit power level, when successfully finished listen-before-talk procedure.

BRIEF DESCRIPTION OF THE DRAWINGS

Embodiments of the present invention will be detailed subsequently referring to the appended drawings, in which.

DETAILED DESCRIPTION OF THE INVENTION

Below, embodiments of the present invention will subsequently be discussed referring to the enclosed figures, wherein identical reference numbers are provided to objects of identical similar function so the description thereof is mutually applicable and interchangeable.

Figure 1:
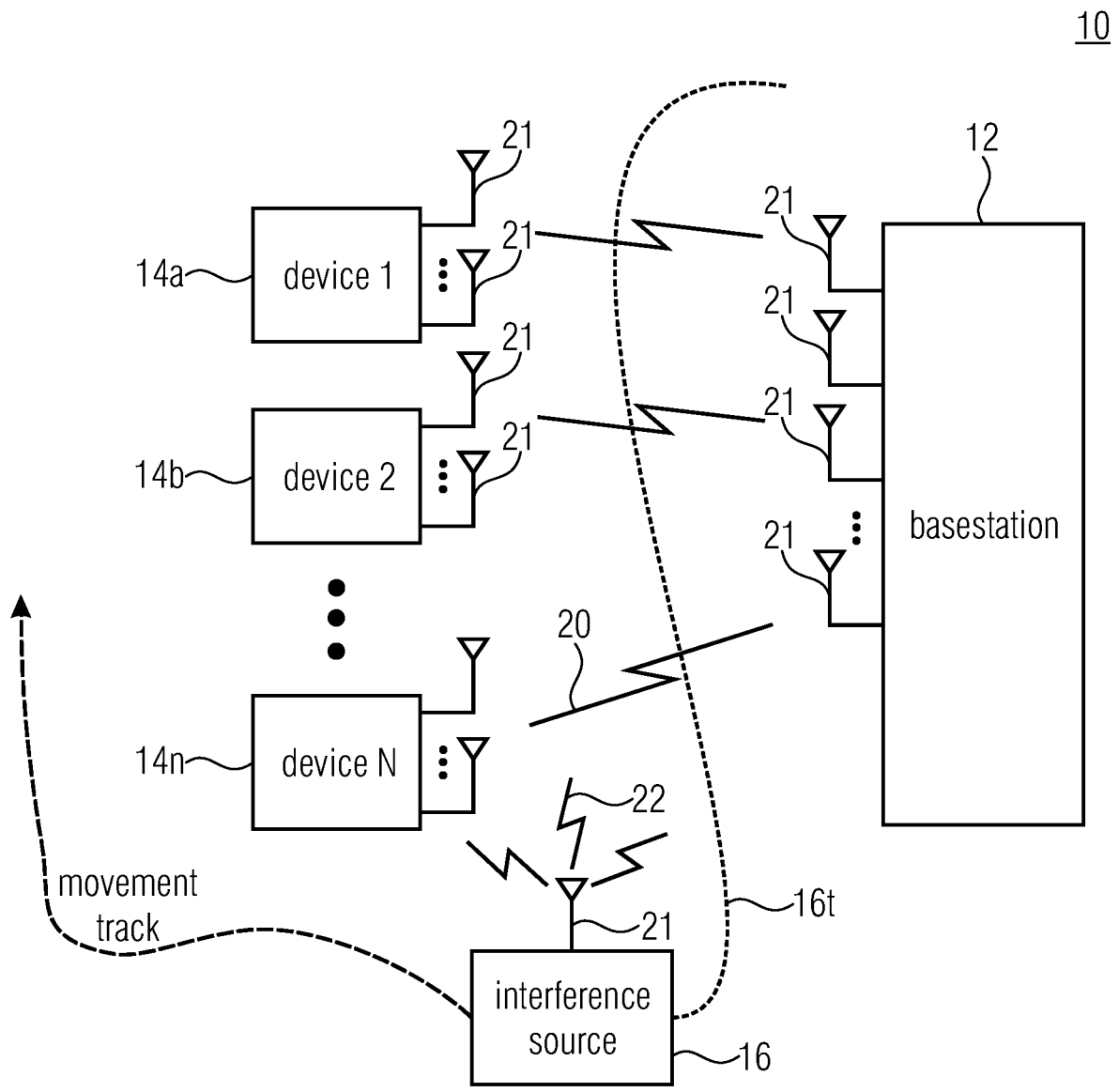
FIG. 1 shows a schematic block diagram providing a generic overview of a communication system consisting of a base station, devices, and an interfering device passing by to illustrate an embodiment according to aspect 1.

FIG. 1 shows a communication system 10 comprising a base station 12 and a plurality of devices 14a-14n. Alternatively, the communication system 10 may just comprise a plurality of devices 14a-14n.

The devices 14a-14n communicate with the base station 12 using RF resources 20, wherein the signals are output by the antennas 21 of the base station 12 and/or devices 14a to 14n. Note, that each device 14a-14n and the base station 12 may optionally comprise a plurality of antennas 21.

Regarding the communication system 10, it should be mentioned that according to embodiments, the system 10 may be a so-called transmission power limited system. Here, the single devices 12, 14a-14n use a limited transmit power in order to avoid listen-before-talk (LBT) procedures. This power may be limited within a first time period before listen-before-talk has successfully been performed in order to reduce latency. Expressed in other words this means that the single device 12, 14a-14n successfully acquires the channel following the listen-before-talk procedure. Furthermore, it is assumed that the base station 12 as well as the communication devices 14a-14n are highly synchronized.

In this situation, an interference source 16 is temporarily arranged so as to interfere with the RF resources 20. For example, the interference source 16 may move along the movement track 16 which extends between the devices 14a-14n and the base station. For example, the interference source 16 may use its antenna 21 to perform an own communication, wherein the RF resources 22 output by the interference source 16 can collide with the resources 20, e.g., with regard to the used frequency band or the used time slots. This may cause problems, e.g., in context of a signal-to-noise ratio (SNR) of the communication 20 between the base station 12 and the devices 14a-14n.

A solution for improving the signal-to-noise ratio of a transmission power limited system 10 with or without real time capabilities will be discussed. The solution according to aspect 1 provides a special approach for resource management based on the determination of the interferer 16.

The shown system 10 comprises a plurality of devices 14a-14n, for example three or more. This enables allows that the position of the individual members 14a-14n can be directly measured. Otherwise, the starting position of the devices can be provided manually. Thus, the system acts as a distributed positioning system. Furthermore, the system in its entirety is configured to detect the interferer 16 and determines an information describing the interferer, e.g., power, time, frequency and space. For this, the system 10 may comprise an interference detector, e.g., formed as shared interference detector by the plurality of devices 14a-14n configured to determine the interferer and to output an information.

For example, as a result, the base station 12 or the calculator of the interference detector, which may be localized within the base station 12, can calculate the position and the trajectory 16t of the interferer 16 as well as its channel and channel changes over time. This knowledge allows for adaptive resource allocation in time, frequency, and space, which minimizes the impact of the interferer 16 on the transmission system 10. This resource adaption may be performed by a resource controller, which may also be localized within the base station. Advantageously this functionality has a sufficiently high update rate for the interference information exchange between the devices 14a-14n and the base station 12. As an example, a communication system 10, like a UWIN communication system, provides an update rate of 125 μs (range between 50-250 μs or 25-500 μs) which allows a position update rate of up to 8000 locations per second. This corresponds to an update rate at each millimeter assuming an interference velocity of 30 km/h. It is possible that the system 10 is only used for the purpose of detecting interference, but typically it transmits communication information as well.

According to embodiments, the information describing the interferer or the information including the measurements performed by the single devices 14a-14n are exchanged by the resources 20. For exchanging these control information/measurement information a part of resources 20 may be used, where another part may be used for a data transmission.

In the above embodiments, it has been assumed that the interference determiner (calculation entity) and the resource controller (processor) may be included in the base station 12. However, the entities may be implemented as shared entities. For example, since the interference determiner uses the measurements of the plurality of devices 14a-14n and the measurements of the base station 12 it is clear that this entity is implemented as shared entity. Expressed in other words this means that each or at least 1 device of the plurality of devices 14a-14n and the base station 12 detect the received power (cf. 22) in the used frequency band and optionally in further frequency bands, too. The detection can be done by analyzing the known transmission gaps within the system 10 and/or by directly analyzing the fluctuations in the received power when the system is active. The information is shared with the system 10 via the established communication links. Analogously, the resource controller may be implemented as a shared entity. For this, information for controlling the measurements and information for transmitting the measurement results and information for controlling the resources may be exchanged. Besides device positions, the system can exchange channel information among their members 14*a*-14*n* in order to determine the link quality between each individual device 14*a*-14*n* and the base station 12. According to embodiments, it should be noted that it is not required to use a base station 12. For example, the communication system 10 may be a self-organizing network, like a self-organizing sensor network without a dedicated base station. Under this understanding, it is clear that the resource controller is implemented as a shared controller.

Figure 2B:
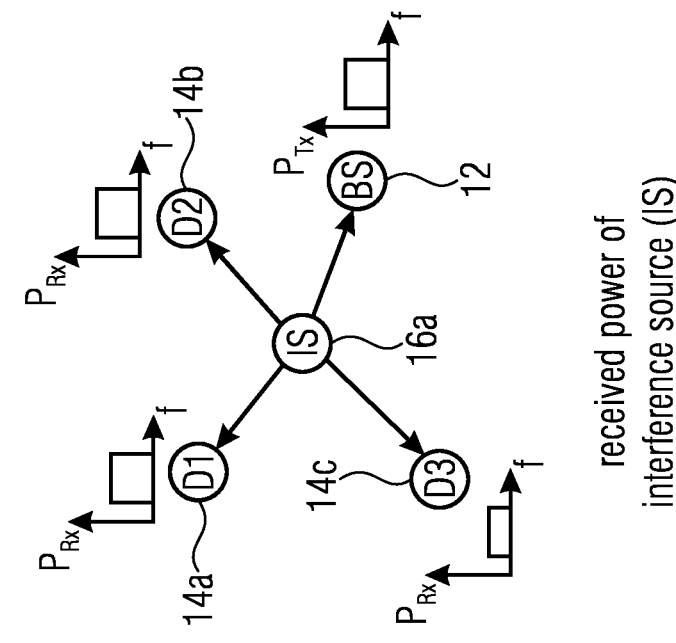
FIGS. 2a, 2b show schematic block diagrams illustrating the difference in receive power of devices (DS) and base stations (BS) with blocking objects and interference sources (IS) to illustrate embodiments of aspect 1.
Figure 2A:
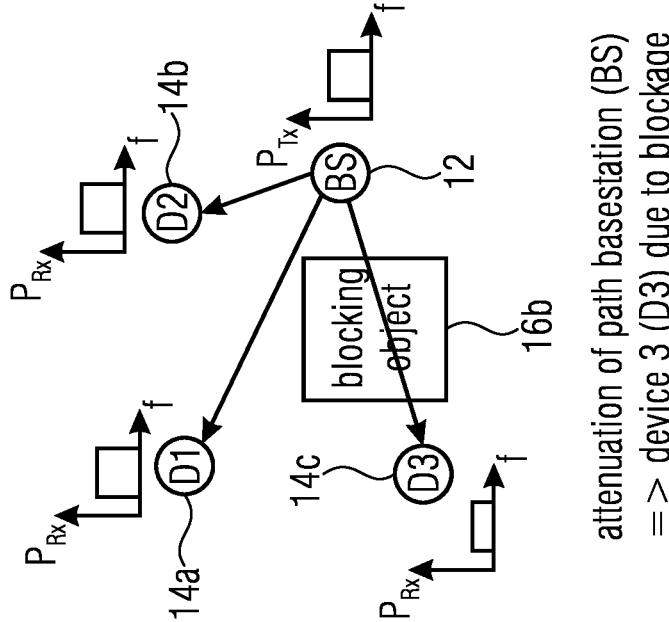

The distributed analysis is used to discern between an interference source 16 which adds to the received power of all devices 14*a*-14*n* synchronously, and a blockage event as source of SNR reduction, which typically does not affect all devices 14*a*-14*n*. This is illustrated by FIGS. 2*a* and 2*b*, wherein FIG. 2*a* shows a blocking object 16*b* as a signal attenuator, while 2*b* shows an interferer 16 adding power to the receive signal of all devices 14*a*-14*d*.

14*a* and 14*b* receive a substantially similar power $P_I$ of the transmit power $P_t$ (cf. base station 12), wherein the receive power $P_r$ of the device 14*c* is reduced. This is illustrated by the respective diagrams illustrating the receive power $P_r$ and the transmit power $P_t$. expressed in other words, this means that an interferer 16*b* does not necessarily effect all devices 14*a* to 14*c* simultaneously with the same power. However, the interferer is usually measurable from all devices 14*a* and 14*c*, and may move, which results in a strong disturbance at all devices over the time. The effect to all devices 14*a* and 14*c* is illustrated by the disturber 16*a* of FIG. 2*b* adding additionally power to the transmitted signal. Here, it is assumed that just the disturber 16*a* adds power, which can be received by the three devices 14*a* to 14*c*, as well as by the base station 12. All entities receive the signal. This measurement can, for example, be done during at a transmit pulse of the base station 12 or when a different frequency band is used by the base station 12. In case a simultaneous transmission of the interferer 16*a* and the base station 12 within the same frequency band occurs, the devices 14*a* to 14*c* would receive a significant increase power level $P_r$, when compared to the expected power level or to the power level as seen with respect to FIG. 3*a*.

To allow this type of coordinated search for interference sources 16*a*, 16*b*, the generic profiles for interference detection are used independently in the devices 14*a*-14*c* and the BS 12, but can also be centrally coordinated by the BS 12 or requested by another device 14*a*-14*c*.

A detected interference source 16*a*, 16*b* can be characterized by for example power, position, speed, cycle time, duty cycle, and others. With such a characterization, the BS can coordinate the resources in time, frequency, and space to avoid the impact of the interference. This is done by predicting the behavior of the interferer and rearranging the resources for an optimum performance. The adaptive resource allocation is especially important in case of pulse-like interference, because its short and strong occurrence of power cannot be compensated without prediction. As a benefit, the system provides positions of interference sources that may not be known beforehand. This enables the ability of avoiding these sources spatially.

According to embodiments, the interferer determination is performed by evaluating the signal strengths of the signal power received by the devices 14*a*-14*c* and 12, wherein the difference between the signals enable the position determination based on triangulating. According to further embodiments, a motion detection is also possible, when evaluating the signal strengths and especially the signal strengths change over time (i.e., over a plurality of frames).

The same applies to the detection of blockages 16*b*, which are characterized by channel/attenuation, position, speed, cycle time, duty cycle and others. The BS can coordinate the resources of the system in time, frequency, and space to avoid the impact of the blockage. The behavior of the blockage event may be predicted such that the resources are rearranged for an optimum performance.

With respect to FIGS. 3*a* and 3*b*, embodiments according to aspect 2 will be discussed.

Figure 3B:
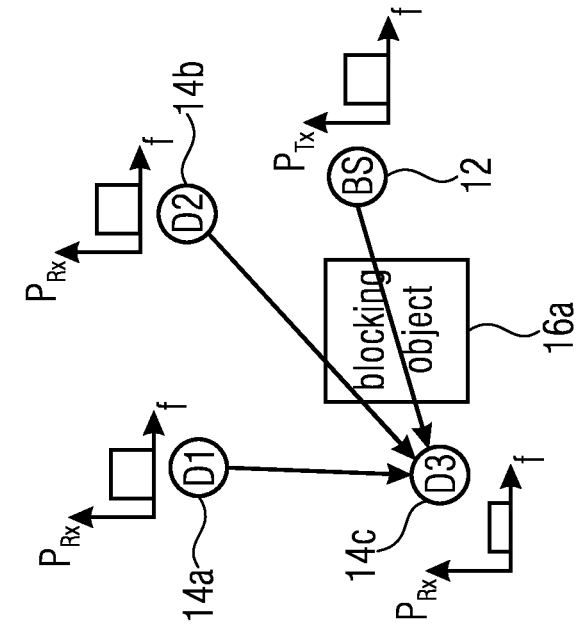
FIGS. 3a, 3b show schematic block diagrams illustrating a synchronous retransmission of information to illustrate embodiments according to aspect 2.
Figure 3A:
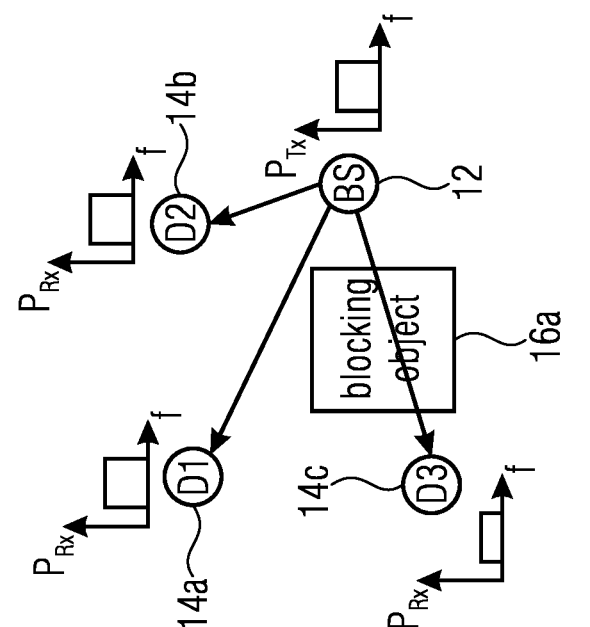

FIGS. 3*a* and 3*b* show a transmission, a plurality for transmitting a data packet from the base station 12 to the device 14*c*. The signal transmitted by the base station 12 is received by all devices 14*a*, 14*b* and 14*c*, wherein the signal received by the device 14*c* is actuated, as illustrated by the $P_r$ power level. The reason for this is the blocking object 16*b*. Here, it should be noted that the communications may, for example, be performed without LBT, so that the transmit power level $P_t$ is limited, e.g., limited by a so-called LBT threshold so that the receive signal $P_r$ at the device 14*c* could not be improved by increasing the power. Therefore, another approach is used, which will be discussed in the context of FIG. 3*b*.

FIG. 3*b* shows an approach enabling to transmit a signal from base station 12 to the device 14*c*. Here, the devices 12 and 14*b* and optionally 14*a*, transmit simultaneously a signal to be received by the device 14*c*. The transmit power $P_t$ of the three devices 14*a*, 14*b* and 12 superimpose to each other, so that the receive power $P_r$ at the device 14*c* is sufficiently high, as indicated by the diagram for $P_r$. This is done without increasing the signal transmit power $P_t$, as can be seen by a comparison between $P_t$ for the base station in FIG. 3 and $P_t$ for the devices 14*a*, 14*b* and 12 in FIG. 3*b*. It should be noted that FIG. 3*b* may illustrate the situation at a point of time subsequent to the point of time of the situation of FIG. 3*a*.

Expressed in other words, this means that this principle utilizes the synchronicity of the system 10 to overcome power and SNR restrictions. The information/data shown is transmitted to a configured number of devices, here 14*a* and 14*b* (cf. FIG. 3*a* and the base station 12). These devices 14*a*, 14*b* and 12 in turn retransmit the information synchronously. The transmission may consider the propagation delay due to the position, channel, or ADC, and achieve constructive superimposition of a power at a target receiver(s). Further, this power combining can be enhanced by utilizing FEC coding with hybrid HARQ and incremental redundancy. This allows to compensate the attenuation effects due to the blockage 16*b*, overcoming the power of an interferer, and generally rising the received signal to noise ratio under power limitations, e.g., by LBT schemes. Furthermore, this approach can be used to combine the power at an interfering LBT device to prevent the LBT acquisition of the channel. Also, it follows the LBT rules, and this method provides significant gains in non-public company premises.

It should be noted that the aspect 2 discussed in the context of FIG. 3*a* and FIG. 3*b* can be combined with the aspect 1 as discussed in the context of FIGS. 1, 2*a* and 2*b*. Background thereof is that, according to embodiments, the position of the interferer/blockage is used to determine which devices are utilized for the synchronous transmission. Furthermore, the position of the signal devices may be used to determine the applied delay or other parameters.

In case of LBT schemes, another aspect according to another embodiment is proposed. The considered real-time system follows the power limitations of LBT and transmits below the LBT threshold. This LBT threshold LBTT is indicated by FIG. 4*b*.

Figures 4A, 4B:
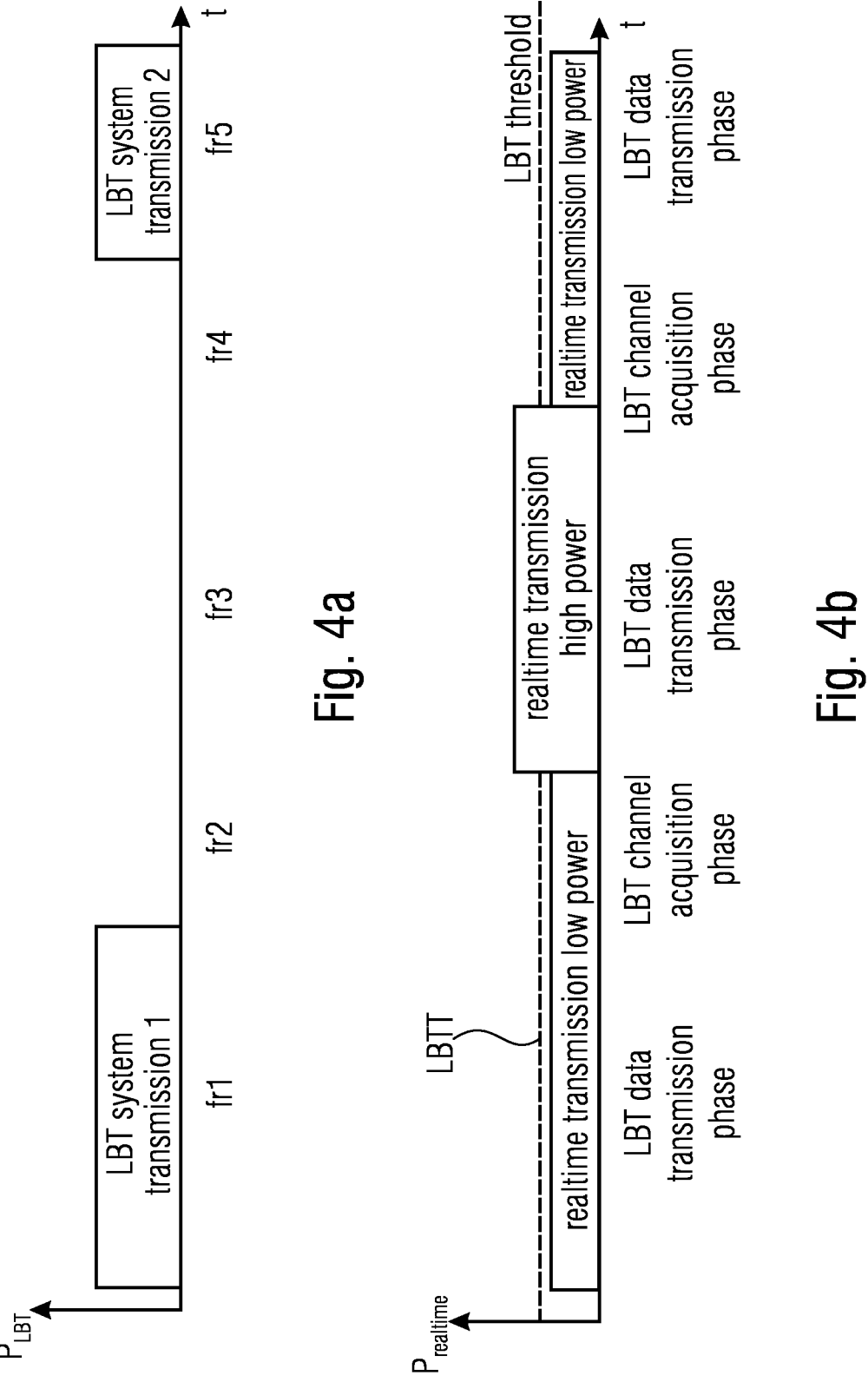
FIGS. 4a, 4b show schematic diagrams of a real time communication system utilizing the LBT mechanism to increase the allowed transmitted power according to embodiments (aspect 2)

FIG. 4a illustrates a transmission of LBT systems, here transmission 1 and transmission 2, while FIG. 4b illustrates a transmission of a real-time transmission system. This real-time transmission system uses different power levels dependent on the current LBT situation as will be discussed below.

FIG. 4a shows that in a first frame and a fifth frame, an LBT system transmission is performed (cf. FR1 and FR5). During these frames FR1 and FR5, the transmission of the further system is performed with low power, i.e., with power below LBTT. During frame 2, i.e., after the LBT system transmission 1, an LBT channel acquisition can be performed by the further system, so that a real-time transmission with high power can follow within frame 3. After that, the channel is acquired for the LBT system transmission 2 during FR4. Consequently, the further system can just use low power during the frames FR4 and FR5 as indicated by FIG. 4b. Note, during the frames FR1 and FR5 (low power frames) other systems may use high power which is not limited by the used protocol.

This means that the system according to aspect 2, also referred to as real-time system, can perform the following communication approach.

The considered real-time system follows the power limitations of LBT and transmits below the LBT threshold. However, at the same time, the usage of the LBT System is analyzed and the LBT procedures are applied to access the LBT channel when possible. The moment it has acquired the LBT guarded band, the transmission power is increased as allowed by regulation. This is done only for the allowed channel acquisition time, after which the power is reduced again enabling other systems to acquire the channel. Due to the increased transmission power, the range or data rate can be further enhanced.

Figures 5A, 5B, 5C:
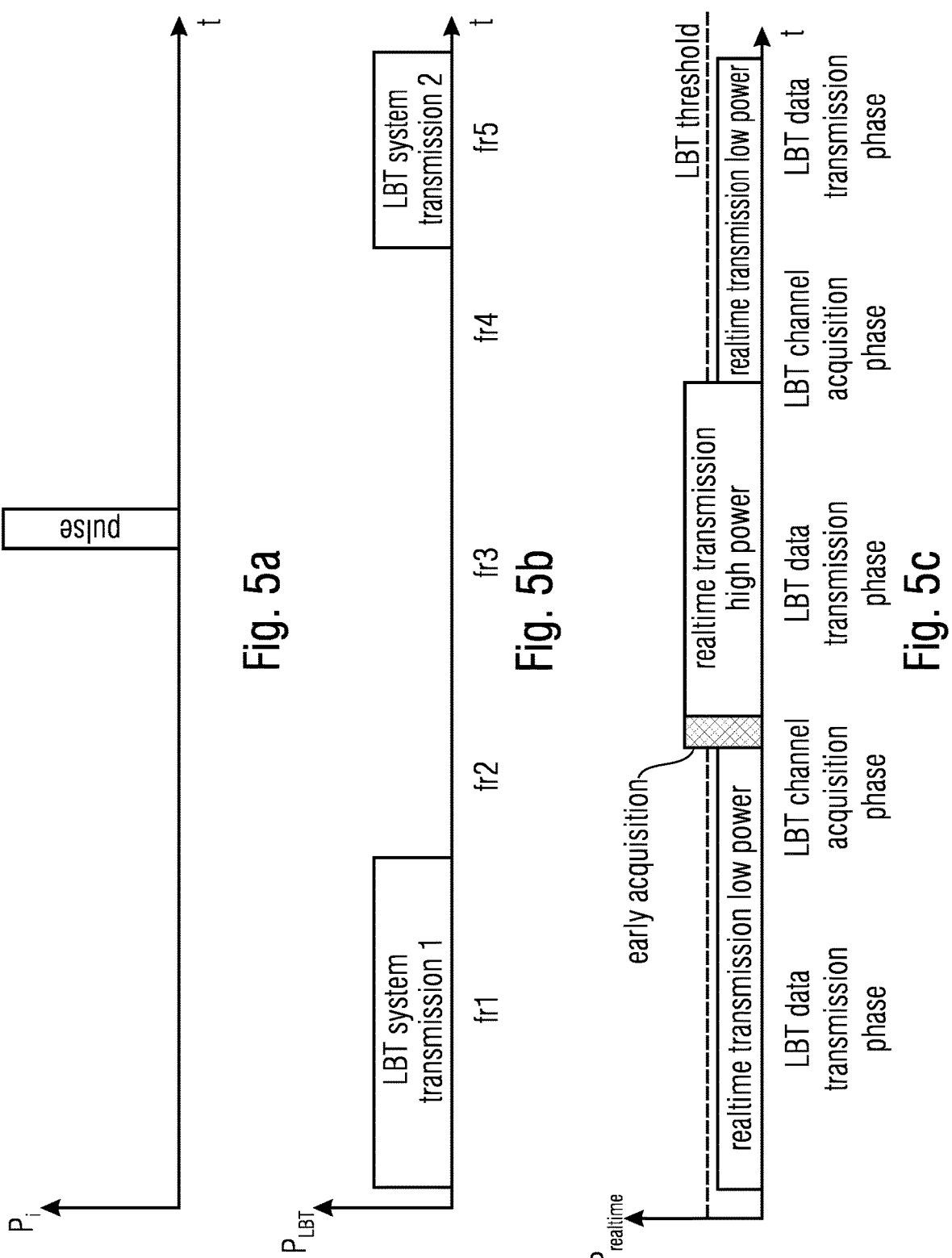
FIGS. 5a, 5b, and 5c show schematic diagrams for illustrating forcing the acquisition of an LBT channel to prevent the LBT system from a predicted interfering pulse with power ($P_i$) to illustrate embodiments.

According to further embodiments, the real-time system with high temporal resolution is able to detect the presence of pulse interferences (cf. aspect 1). This is illustrated by FIGS. 5a, 5b and 5c. FIG. 5a shows the transmission of the LBT system, FIG. 5b the transmission of said real-time system with an early acquisition phase, wherein FIG. 5c shows a single pulse within frame FR3.

If its characterization in time is achieved and its behavior is predicted successfully, the system will be able to notify devices with unsuccessful prediction about the interferer. Additionally, in case of LBT operation, the system may force a channel acquisition just prior to the pulse interference by potentially ignoring the LBT timeout rules. The results are twofold. On the one hand, the real-time system reliably acquires the channel and continues transmitting while coping with the pulse. On the other hand, the LBT system is prevented from an interfered channel that would likely yield retransmissions. An extension of this procedure leads to an externally controlled coordination of the LBT system. Note that, as mentioned above, ignoring the LBT regulations is a reasonable scenario in non-public networks at company premises.

Figure 6:
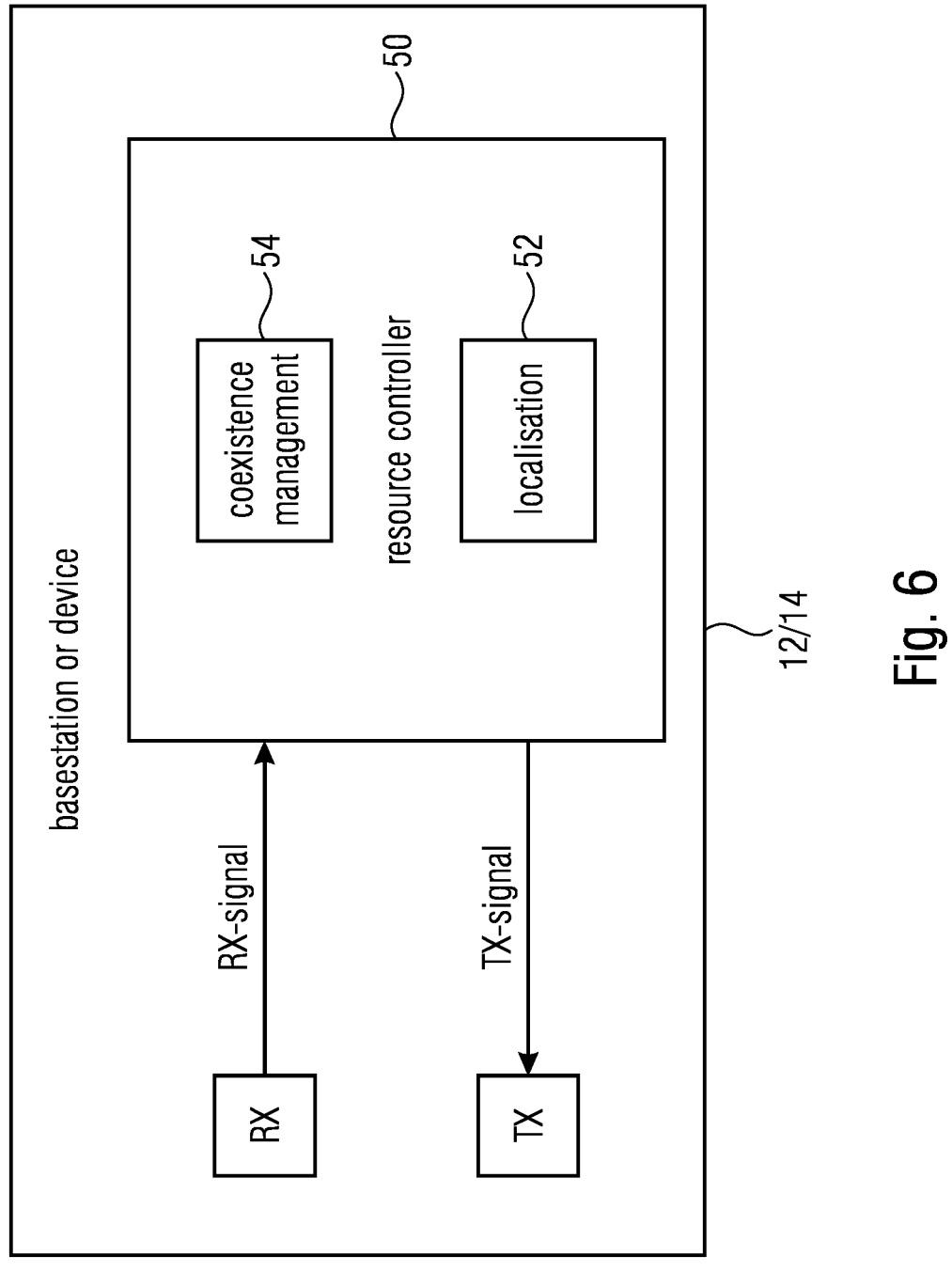
FIG. 6 shows a schematic block diagram of a wireless system for localization of a coexistence management.

All considered aspects can be addressed by a resource controller as is illustrated in FIG. 6.

FIG. 6 shows a controller 15, e.g., implemented in a base station 12 or a device 14. The controller 15 comprises a localization determiner configured to determine an interference and to detect its position. In this localization, entities are marked by the reference number 52, (also referred to as interference detector 52). Furthermore, the resource controller comprises a coexistence management controller marked by the reference number 54. This coexistence management controller uses the approach as discussed in the context of FIG. 2 with or without the LBT aspect or uses information from the localization entity 52 in order to determine the resources.

The system may consist of multiple nodes that can act as either a base station or a device. The node's resource controller contains a localization unit that processes all position-related information. It determines the position and channel characteristics of other nodes using the RX signal and provides information to be transmitted to other nodes of the system. This information contains, e.g., local synchronization deviation, sampling offset, local time, processing delay and/or network information such as known (or calculated) position/channel information or control/status information for distributed positioning calculation.

The resource controller also contains a coexistence management unit that analyses the received signal regarding other wireless communication systems, e.g., IEEE 802.11, and noise, e.g., microwave oven, pulse noise from arc welding, etc. It characterizes the type of system and provides information on how to react accordingly. In case of a detected LBT system, it provides the methods for (modified) channel acquisition, as described above. Also, the coexistence management unit performs interference prediction. The knowledge is used by the resource controller that adapts the resources of coding, modulation, time, space, and frequency. Furthermore, it processes relaying capabilities of other nodes and distributes local capabilities to optimize the data transmission within the system.

To sum up, according to aspects of the present invention, the interference detector can be used for performing a listen before talk procedure, while already transmitting with reduced power. Then, after successfully completing the LBT channel acquisition the transmit power can be increased. According to another aspect, the interference detector can determine, track and predict the position of the interferer and adapt the resources, e.g., the power accordingly. For example, the power can be reduced or it can be avoided to transmit with the interferer simultaneously. Since the system is able to predict the interference and its movement, the described behavior may continue, even if the interferer is turned off unexpectedly. According to another aspect, an increase in power at the receiver is caused, if the system uses power combining, so as to increase the SNR at the receiver beyond the limit that is possible with a single device transmission. According to a further aspect, the system power would fluctuate dependent on further actives, due to the listen before talk algorithm. For example, a listen before talk procedure can be performed for increasing the power and wherein the power is reduced again, when the listen before talk algorithm determinates another entity, i.e., another device or very high interference power. In case the system determines a pulse interferer, the system can synchronize its transmission power accordingly, either by avoiding the pulse or by encompassing the pulse. The latter could mean higher transmission power, other modulation encoding or arranging the data transmission around the time of interference (e.g. avoiding the transmission of data for the duration of the interference).

Potential use cases for the above-mentioned aspects are:
In general: ultra-reliable communication system for real-time applications.
Automated guided vehicles (AGVs) with mounted robots in factories. This means that all fixed installations can be considered as mobile interference.
Troubleshooting system for interference extermination in a wireless communication setup.

Cable replacement and more flexible installations, e.g., in production sites.

Wireless control systems

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A communication system, comprising:
a plurality of communication devices communicating with each other by use of RF resources;
a resource controller configured to control the RF resources; and
an interference detector configured to detect an interferer and to provide information describing the interferer to the resource controller, wherein the resource controller controls the RF resources of the plurality of communication devices taking into account the information describing the interferer;
wherein the interference detector is configured to discern between an interferer superimposing RF power for all devices and a blockage event affecting at least one of the plurality of communication devices; and/or
wherein the interference detector is configured to determine a trajectory and/or a movement of the interferer when moving based on the determination over a frame or a plurality of frames;
wherein the information comprises information regarding position and/or a communication resource, a time resource, a frequency resource, a space resource, a duty cycle and/or a transmit power of the interferer.

2. The communication system according to claim 1, wherein the controlling of the RF resources is performed such that no collision is caused between RF resources used by the interferer and the RF resources controlled by the resource controller and/or to minimize the impact of the interferer on the communication between the plurality of communication devices.

3. The communication system according to claim 1, wherein the interference detector is implemented as a shared interference detector using at least two transceivers of the plurality of communication devices for measurements; or
wherein the interference detector is realized as a shared interference detector using al least two transceivers of the plurality of communication devices for measurements, wherein said information is shared between the plurality of communication devices so as to implement the shared interference detector and/or wherein control information for controlling the measurements performed by the transceivers for detecting the interferer is exchanged.

4. The communication system according to claim 1, wherein an interferer's superimposing RF power is determined when a plurality of all communication devices receive the interferer within the used band or another band; or wherein a blockage event is determined when at least one device receives an RF signal reduced in strength and/or quality when compared to the RF signal received by the other communication devices.

5. The communication system according to claim 1, wherein the resource control is implemented as a shared controller.

6. The communication system according to claim 1, wherein the communication system comprises a self organizing network and/or a self organizing sensor network.

7. The communication system according to claim 1, wherein at least one communication device is formed by a base station of the communication system.

8. The communication system according to claim 1, wherein an interference detector is configured to detect and/or locate the interferer.

9. The communication system according to claim 1, wherein each or at least two of the communication devices transmit the transmit signal without following a listen-before-talk procedure by use of a reduced transmit power level below a listen-before-talk threshold power level.

10. The communication system according to claim 1, wherein the plurality of the communication devices communicate within a frequency band requiring the heeding of a listen-before-talk procedure for channel acquisition.

11. The communication system according to claim 1, wherein at least one of the plurality of communication devices is configured to perform listen-before-talk procedure, while transmitting and/or to increase a transmit power, when successfully finished the listen-before-talk procedure; or wherein at least one of the plurality of communication devices is configured to perform a listen-before-talk procedure and to inform another one of the plurality of communication devices to increase a transmit power of the another one, when successfully finished the listen-before-talk procedure.

12. The communication system according to claim 1, wherein the resource controller is configured to force a channel acquisition in order to the pulse interference.

13. The communication system according to claim 1, wherein the resource controller comprises a HARQ or HRQ controller.

14. A communication system, comprising:

a plurality of communication devices communicating with each other by use of an RF resource;

a resource controller configured to control the RF resources, wherein the resource controller is configured to synchronize at least two of a plurality of communication devices with regard to its transmit signals, so that said transmit signals are superimposing to each other and are forming one superimposed transmit signal;

wherein at least two transmit signals output by at least two of the plurality of communication devices are superimposed so as to increase the total transmit power and/or the signal-to-noise ratio of the superimposed transmit signal.

15. The communication system according to claim 14, wherein one of the communication devices transmits a signal to at least one other of the communication devices, said signal is to be transmitted synchronously by the at least two of the communication devices.

16. The communication system according to claim 14, wherein each or at least two of the communication devices transmit the transmit signal without following a listen-before-talk procedure by use of a reduced transmit power level below a listen-before-talk threshold power level.

17. The communication system according to claim 14, wherein the plurality of the communication devices communicate within a frequency band requiring the heeding of a listen-before-talk procedure for channel acquisition.

18. The communication system according to claim 14, wherein at least one of the plurality of communication devices is configured to perform listen-before-talk procedure, while transmitting and/or to increase a transmit power, when successfully finished the listen-before-talk procedure; or wherein at least one of the plurality of communication devices is configured to perform a listen-before-talk procedure and to inform another one of the plurality of communication devices to increase a transmit power of the another one, when successfully finished the listen-before-talk procedure.

19. The communication system according to claim 14, wherein the resource controller is configured to force a channel acquisition in order to the pulse interference.

20. The communication system according to claim 14, wherein the communication system comprises an interference detector configured to detect an interferer and to provide information describing the interferer to the resource controller, wherein the resource controller controls the RF resources of the plurality of communication devices taking into account the information describing the interferer.

21. The communication system according to claim 14, wherein the resource controller comprises a HARQ or HRQ controller.

22. A method for resource controlling within a communication system comprising a plurality of communication devices communicating with each other by use of RF resources, comprising:

detecting an interferer and providing information describing the interferer; and controlling the RF resources of the plurality of communication devices taking into account information describing the interferer;

discerning between an interferer superimposing RF power for all devices and a blockage event affecting at least one of the plurality of communication devices; and/or determining a trajectory and/or a movement of the interferer when moving based on the determination over a frame or a plurality of frames;

wherein the information comprises information regarding position and/or a communication resource, a time resource, a frequency resource, a space resource, a duty cycle and/or a transmit power of the interferer.

23. A method for resource controlling within a communication system comprising a plurality of communication devices communicating with each other by use of RF resources, the method comprises:

synchronizing at least two of the plurality of communication devices with regard to its transmit signals so that said transmit signals superimposing to each other and forming one superimposed transmit signal;

wherein at least two transmit signals output by at least two of the plurality of communication devices are superimposed so as to increase the total transmit power and/or the signal-to-noise ratio of the superimposed transmit signal.

24. A resource controller for a communication system comprising a plurality of communication devices communicating with each other by use of RF resources, the controller comprising:

a resource controller configured to control the RF resources and an interference detector configured to detect an interferer and to provide information describing an interferer to the resource controller, wherein the resource controller controls the resources of the plurality of devices taking into account the information describing an interferer;

wherein the interference detector is configured to discern between an interferer superimposing RF power for all devices and a blockage event affecting at least one of the plurality of communication devices; and/or wherein the interference detector is configured to determine a trajectory and/or a movement of the interferer when moving based on the determination over a frame or a plurality of frames.

25. A resource controller for a communication network comprising a plurality of communication devices communicating with each other by use of RF signals, the controller comprising:

a resource controller configured to control the RF resources, wherein the resource controller is configured to synchronize at least two of a plurality of communication devices with regard to its transmit signals, so that said transmit signals superimposing to each other and/or forming one superimposed transmit signal;

wherein at least two transmit signals output by at least two of the plurality of communication devices are superimposed so as to increase the total transmit power and/or the signal-to-noise ratio of the superimposed transmit signal.

26. User equipment being part of the controller or comprising the controller for a communication system comprising a plurality of communication devices communicating with each other by use of RF resources, the controller comprising:

a resource controller configured to control the RF resources and an interference detector configured to detect an interferer and to provide information describing an interferer to the resource controller, wherein the resource controller controls the resources of the plurality of devices taking into account the information describing an interferer, wherein the interference detector is configured to discern between an interferer superimposing RF power for all devices and a blockage event affecting at least one of the plurality of communication devices; and/or wherein the interference detector is configured to determine a trajectory and/or a movement of the interferer when moving based on the determination over a frame or a plurality of frames, or the controller configured to control the RF resources, wherein the resource controller is configured to synchronize at least two of a plurality of communication devices with regard to its transmit signals, so that said transmit signals superimposing to each other and/or forming one superimposed transmit signal; wherein at least two transmit signals output by at least two of the plurality of communication devices are superimposed so as to increase the total transmit power and/or the signal-to-noise ratio of the superimposed transmit signal.

27. A base station being part of the controller or comprising the controller for a communication system comprising a plurality of communication devices communicating with each other by use of RF resources, the controller comprising:

a resource controller configured to control the RF resources and an interference detector configured to detect an interferer and to provide information describing an interferer to the resource controller, wherein the resource controller controls the resources of the plurality of devices taking into account the information describing an interferer, wherein the interference detector is configured to discern between an interferer superimposing RF power for all devices and a blockage event affecting at least one of the plurality of communication devices; and/or wherein the interference detector is configured to determine a trajectory and/or a movement of the interferer when moving based on the determination over a frame or a plurality of frames or the controller configured to control the RF resources, wherein the resource controller is configured to synchronize at least two of a plurality of communication devices with regard to its transmit signals, so that said transmit signals superimposing to each other and/or forming one superimposed transmit signal; wherein at least two transmit signals output by at least two of the plurality of communication devices are superimposed so as to increase the total transmit power and/or the signal-to-noise ratio of the superimposed transmit signal.

28. A communication device, which is configured transmit a transmit signal without listen-before-talk procedure by use of a reduced transmit power level below a listen-before-talk threshold power level and to perform listen-before-talk procedure, while transmitting at reduced transmit power level, and to increase the reduced transmit power level, when successfully finished the listen-before-talk procedure, so as to further transmit the transmit signal with increased transmit power level.

29. A method for communicating, comprising:

transmitting a transmit signal without listen-before-talk procedure by use of a reduced transmit power level below a listen-before-talk threshold power level;

performing listen-before-talk procedure while transmitting at reduced transmit power level; and increasing the reduced transmit power level, when successfully completing the listen-before-talk procedure, so as to further transmit the transmit signal with increased transmit power level.

30. A non-transitory digital storage medium having a computer program stored thereon to perform the method for resource controlling within a communication system comprising a plurality of communication devices communicating with each other by use of RF resources, comprising:

detecting an interferer and providing information describing the interferer; and controlling the RF resources of the plurality of communication devices taking into account information describing the interferer;

discerning between an interferer superimposing RF power for all devices and a blockage event affecting at least one of the plurality of communication devices; and/or determining a trajectory and/or a movement of the interferer when moving based on the determination over a frame or a plurality of frames, when said computer program is run by a computer.

31. A non-transitory digital storage medium having a computer program stored thereon to perform the method for resource controlling within a communication system comprising a plurality of communication devices communicating with each other by use of RF resources, the method comprises:

synchronizing at least two of the plurality of communication devices with regard to its transmit signals so that said transmit signals superimposing to each other and forming one superimposed transmit signal, wherein at least two transmit signals output by at least two of the plurality of communication devices are superimposed so as to increase the total transmit power and/or the signal-to-noise ratio of the superimposed transmit signal;

when said computer program is run by a computer.

32. A non-transitory digital storage medium having a computer program stored thereon to perform the method for communicating, comprising:

transmitting the transmit signal without listen-before-talk procedure by use of a reduced transmit power level below a listen-before-talk threshold power level;

performing listen-before-talk procedure while transmitting at reduced transmit power level; and increasing the reduced transmit power level, when successfully completing the listen-before-talk procedure, so as to further transmit the transmit signal with increased transmit power level, when said computer program is run by a computer.

\* \* \* \* \*